March 23, 1965 D. SCHIFF ETAL 3,174,705
SPACE STATION AND SYSTEM FOR OPERATING SAME
Filed May 18, 1959 2 Sheets-Sheet 1

INVENTORS
DANIEL SCHIFF
RICHARD W. SLOCUM, JR.
BY
ATTORNEY

INVENTORS
DANIEL SCHIFF
RICHARD W. SLOCUM, JR.
BY *N. Vincent Haresh*
ATTORNEY

United States Patent Office 3,174,705
Patented Mar. 23, 1965

3,174,705
SPACE STATION AND SYSTEM FOR
OPERATING SAME
Daniel Schiff, Framingham Center, and Richard W. Slocum, Jr., Cambridge, Mass., assignors to Raytheon Company, Lexington, Mass., a corporation of Delaware
Filed May 18, 1959, Ser. No. 813,706
10 Claims. (Cl. 244—1)

This invention pertains generally to space stations and the like, and more particularly to a novel form of space station or vehicle and a system for maintaining such vehicle at a desired location in spaced-apart relationship with respect to a mother planet or the like in response to incident microwave energy.

The prior art affords many examples of apparatus adapted to be propelled in spaced-apart relationship with the earth, either within or above what is generally regarded as the "atmosphere" of the earth, as well as systems for maintaining this relationship in opposition to the gravitational field of the earth. Exemplary devices of this type are conventional aircraft (both jet and propeller driven) and the more modern un-manned or pilotless vehicles such as rocket-propelled missiles. However, the operation of each of these vehicles of the prior art necessitates the expenditure of a fuel carried by the vehicle. Further, while an orbital earth satellite requires no applied energy in executing a given orbit, enormous quantities of fuel are consumed in launching the satellite into orbit. Also, where the satellite vehicle is designed for the subsequent correction of or other change in the orbital path, a fuel supply must be carried by the satellite in order to provide the desired corrective thrusts.

It is thus apparent that in each of these prior art vehicles a fuel supply must be carried thereby for local consumption in order to initiate, maintain or alter a given flight pattern, whether such pattern involves motion of the vehicle relative to the earth or a substantially motionless hovering with respect thereto. It therefore follows that the maximum payload capabilities of such vehicles are limited by the fact that the vehicle must support the weight of the fuel carried thereby. Also, such vehicles are not naturally adapted to indefinitely long periods of continuous operation, since the fuel supply therein will eventually be exhausted, necessitating a return of the vehicle to a refueling base, or alternatively, an in-flight refueling process as is accomplished with some conventional aircraft.

With respect to the ability of each of the prior art vehicles to hover over a fixed point on the surface of the earth, generally only the helicopter and lighter-than-air vehicles such as the dirigible may be so employed. Where it is desired to cause such a device to hover for an indefinitely long period of time without being tethered (as in the case of some balloons), the dirigible will prove more practical in view of its relatively low power requirements. However, even the dirigible is limited as to the length of time that it can hover in one spot above the surface of the earth, since even if it were to be assumed that the desired buoyancy could be maintained indefinitely, the power required to counteract the forces of wind motion against the skin of the dirigible would soon exhaust the supply of gasoline or other fuel carried aboard the airship, and the desirable hovering operation would thus be terminated. As a practical matter, also, dirigibles, balloons and the like suffer from diffusion of the relatively buoyant gases therein through the skin or other containing medium into the outer atmosphere, with a subsequent loss of lift in the craft which generally requires the return of the vehicle to the earth for supplementation of the buoyant gas supply.

The utility of a space vehicle or the like which is capable of sustained flight over an indefinitely long period of time without employing a local fuel supply is evident, and the applications therefor are numerous. For example, a vehicle capable of perpetual operation (except for mechanical failure) and stationed in space above the surface of the earth, either within or without the atmosphere thereof, may perform alarm and surveillance tasks by radar techniques, along with guidance and protection of defense vehicles, and may simultaneously provide long-haul broadband communications. Systems in such vehicles or platforms may be established to provide radar and communication networks.

These desired operational characteristics are provided by the vehicle of the present invention, which vehicle is energized by means of transmitted microwave electromagnetic energy that is beamed toward the vehicle. The microwave energy incident upon the vehicle is converted into appropriate mechanical forces which produce the desired hovering operation of the vehicle. The advantages attendant the utilization of microwave energy, in contrast to electromagnetic energy of other wavelengths, are readily apparent. Microwaves have been generally defined as radio waves whose wavelength is less than 30 centimeters, with a lower wavelength limit on the order of one millimeter or one centimeter sometimes being supplied to what is called "the microwave region." The superiority of microwaves is due in part to the fact that it is generally necessary to focus the transmitted energy so as to achieve a desirably high power density at a remote point or area with respect to a given generator or transmitter power level. In accordance with the laws of optics, the sharpness of the beam produced by an antenna varies as the ratio of antenna dimensions to the wavelength of the transmitted energy. Thus, for a given or desired power density or beam sharpness, a decrease in the wavelength of the transmitted energy permits a corresponding decrease in the dimensions of the antenna. From the standpoint of mechanical convenience, it is generally desirable to employ small antennas and other components, and it is therefore advantageous to employ energy of very short wavelength. In addition, the difficulties encountered in relatively long wave transmission as a result of natural and man-made interference or noise (which noise would interfere with the transmission of radar or communications intelligence via the microwave power beam) do not occur with any appreciable significance at microwave frequencies. Also, where the space vehicle is to be operated at an altitude above the ionosphere, long wave transmission will generally be reflected by the reflecting layers thereof, while microwaves pass through such layers substantially unaffected.

In view of the several advantages stated above, it might appear desirable to employ the shortest wavelength possible commensurate with the power-generating capabilities of the transmitter at the wavelength chosen. A lower limit is fixed, however, for the wavelength that may be used in a practical radiating system in view of the increasing losses due to absorption occurring in the atmosphere at wavelengths below five to ten centimeters. In the one to two centimeter region there is a peak in absorption by water vapor, and even for dry air the absorption of electromagnetic energy increases very rapidly below one or two centimeters. It may thus be seen that microwaves in a region having the approximate bounds of two and thirty centimeters are readily adaptable to convenient radiation of energy to a remote point with small transmission loss, with the preferred wavelengths being of the order of five or ten centimeters in order to accomplish efficient focusing with a transmitting lens system of reasonable size without inflicting an intolerable power loss by absorption.

The key to the practical utilization of high-power electromagnetic beams for remote energization of space vehicles and the like is a device which will generate large amounts of power within this wavelength region. In addition, many applications of such high-power beams require such refinements as broad electronic bandwidth and low phase distortion, placing the additional requirement of sophisticated performance on the high-power generator. A device which currently satisfies the dual requirements of high power output and refined performance is the Amplitron tube, a relatively new type of crossed-field vacuum tube which may be used as a compact, highly efficient, broadband amplifier capable of handling high peak and average powers, and which generally comprises a circular but non-reentrant, dispersive network matched at both ends over the frequency region of interest, and a reentrant electron beam originating from a continuously-coated (or nearly so) cathode coaxial with the network, with a D.-C. potential being applied between the cathode and anode, and a magnetic field applied parallel to the axis of the cathode and transverse to the electric field between the anode and the cathode. For a more complete description of the Amplitron, reference may be had to the copending application of William C. Brown, Serial No. 706,812, filed January 2, 1958, for "Low Level Duplexer System." Amplitrons currently available are capable of producing 15 or 20 kilowatts of average radio-frequency power in the neighborhood of ten centimeters in wavelength, and future models are expected to yield 500 kilowatts or more average power, with 50 megawatt peak power.

It is accordingly a primary object of the present invention to provide a vehicle which may be employed as a space station or the like, and which is adapted for an indefinitely long period of operation at a selectable location above the surface of the earth or other mother planet.

A further object of this invention is to provide a vehicle adapted to be supported against the gravitational field of a mother planet by means of an enclosed gaseous medium lighter than that surrounding the enclosure, without having the disadvantages of the balloons and the like of the prior art, which lose buoyancy through the diffusion of such lighter gaseous medium through the enclosing skin or other enclosure.

Still another object of this invention is to provide a vehicle which may be employed as a space station or the like, and which is adapted for an indefinitely long period of operation at a selected location above the surface of the earth or other mother planet, with the energy necessary for such operation being supplied to such device in the form of radiated microwave electromagnetic energy.

An additional object of the invention is to provide a system for maintaining such a space station or the like in spaced-apart relationship with a mother planet at a selectable location with respect thereto in response to incident microwave electromagnetic energy transmitted from such mother planet to the space station.

In accordance with the present invention, the above and other objects are achieved by means of a balloon-like enclosure means with means therein responsive to microwave energy for maintaining the density of the gaseous matter within the enclosure means at a level less than that of the gaseous matter surrounding such enclosure. In the preferred form of the apparatus of the invention this density-maintaining means takes the form of an absorbing device for converting received microwave electromagnetic radiation into heat to raise the temperature of the interior of the enclosure and thereby expand the gaseous matter therein. By means of the temperature differential between the interior of the balloon or bag and the atmosphere to the exterior thereof, the desired density differential is maintained and the requisite buoyancy is provided. The lifting force thus provided is not deleteriously affected by diffusion of the interior medium through the enclosure or bag, since the exterior medium which diffuses into the enclosure is heated by the absorber-converter, and the density level is thus maintained.

In order to offset the forces applied to the enclosure by winds, such wind forces usually being substantially normal to the direction of the gravitational pull thereon or at a rather small angle away from the horizontal, a suitable propulsion means is provided to produce a balancing thrust opposite to the wind direction. The enclosure means will preferably take an elongate form, such as a cigar or the like, in order to provide a bag which will automatically face into the wind (in the manner of a weather vane) to present a minimum cross section to the direction of wind flow to reduce the force applied to the enclosure by such winds. The craft has a weather vane action so as to maintain it heading into the wind by virtue of the propeller action and the inertia of the vehicle tending to hold the vehicle against assuming a motion in the direction of new flow. By locating the center of gravity and hence the inertial forces forward or on the membrane side of the geometrical center of the craft as viewed in FIG. 2, the craft is thereby enabled to head upwind in a manner analogous to a weather vane. The propulsion means may include a single output (such as a propeller or a jet stream) directed along the length of the bag, or may include an output at each end thereof. In either case, the engine or engines may be adjustably mounted so as to permit adjustment of the direction of thrust thereof, or, alternatively, one or more suitable adjustable vanes may be employed to control the direction of the applied thrust. In order to provide energy for operation of the propulsion means, means are provided for receiving the aforementioned radiated energy and for either directly applying such energy to the motive power means for effecting the desired propulsion, or for converting the received energy into another form suitable for operation of the particular propulsion motive power source employed.

In order to supply the desired radiated energy, transmitting means are provided on the mother planet for radiating such energy to the space station to be received by the aforementioned absorbing and receiving means. In the preferred form of the apparatus of the invention, the radiated energy is in the form of a microwave beam directed toward the target.

With the above considerations and objects in mind, the invention itself will now be described in connection with a preferred embodiment thereof given by way of example and not of limitation, and with reference to the accompanying drawings, in which.

Figure 1:
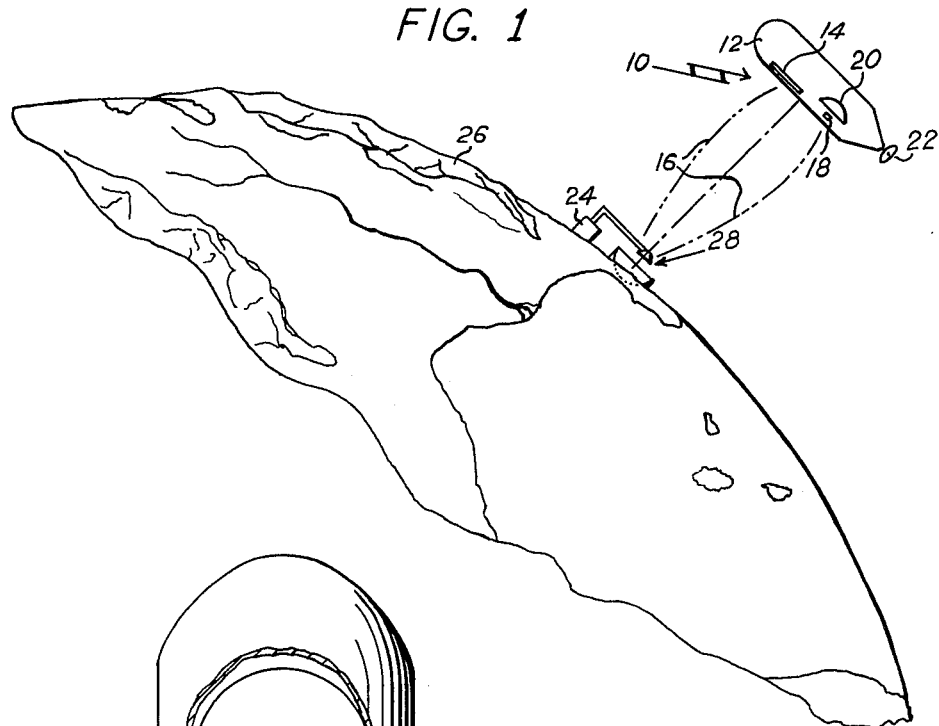
FIG. 1 is a schematic representation in elevation of the major components of the system of the present invention.

Referring now to FIG. 1 of the drawings, the space station of the present invention is indicated generally at 10, and includes a flexible or elastic balloon-like enclosure or bag 12 having an absorbing membrane 14 or the like supported therein (by means not shown) for absorbing incident microwave electromagnetic radiations such as indicated at 16. An exemplary form of such absorbing membrane is a thin plastic sheet or the like which is coated with a suitable anechoic or absorbing material of high specific resistance, such as that sold under the trade name of Kanthol. Alternatively, membrane 14 may comprise a light-weight, resilient member of an absorbing material, such as that sold under the trade name of Eccosorb. Specifically, such membrane may be comprised of any suitable material such as dry pine lumber, light weight epoxy casting resin, epoxy ceramic foam, lossy organic foam, etc., such materials being of a class having a relatively low dielectric constant and a relatively high dissipation factor or loss tangent. A suitable range for such values is 1 to 2.5 dielectric constant and .006 to 1.0 dissipation factor. The dissipation factor indicates the energy loss character of a material and is proportional to the ratio of the dielectric constant to loss factor of a material. A receiving antenna 18 is located at the focus of a reflector 20, also in the path of the radiation 16, with the energy received thereby being converted into a propulsive force in a direction opposite to the direction of incident winds as by a suitable propulsion means indicated schematically by the propeller 22. It will be understood of course, that these members may alternatively be mounted exterior of the enclosure 12.

The source of the radiation 16 is a radio frequency transmitting means 24 on the surface of the earth or other mother planet 26, and having a radiating antenna assembly 28. As will be appreciated by those skilled in the art, the representations of the transmitting equipment and microwave beam in FIG. 1 are highly diagrammatic in form, and the present invention is not limited to any particular transmitter or antenna assembly. As a practical matter, however, the reflector of the antenna assembly 28 is considerably larger than most of the reflectors of the prior art in order to focus a large amount of power at a high-altitude (e.g., 65,000 feet) space vehicle. In an exemplary embodiment, the antenna reflector is at least partially supported in a large bowl or other dug-out area on the earth's surface so as to provide a convenient means of support therefor. Also, the antenna may actually comprise a large number of small horn and reflector assemblies. In addition, the transmitter 24 is capable of much greater power output than most of the prior art transmitters, and, as stated in the earlier paragraphs of this specification, the power-generating element of the transmitter is preferably an Amplitron tube in order to achieve sufficient power output.

It will be understood that only the basic elements of the vehicle 10 are shown in the drawing, and that other frame members and the like would normally be provided to support a payload of radar, communication or other similar equipment. In this connection, the beam 16 also provides a signal-information link between the ground station and the payload equipment on the vehicle.

Figure 2:
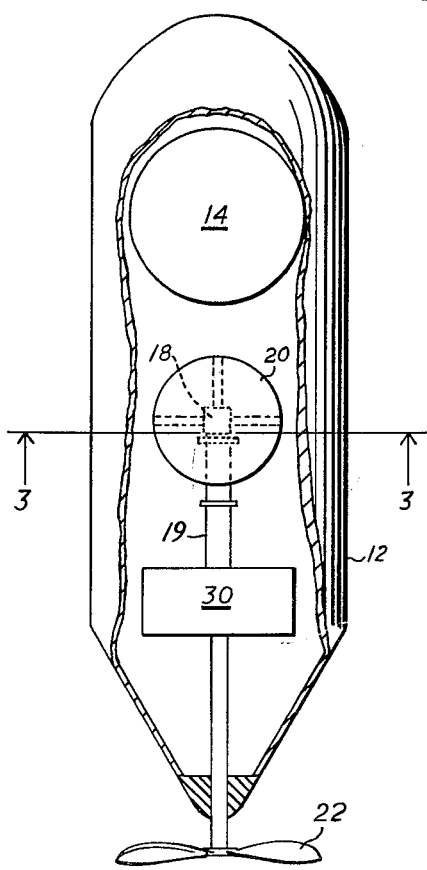
FIG. 2 is a plan view, partly broken away, of a preferred form of the space station of the invention.

FIG. 2 shows in somewhat greater detail the several parts comprising a preferred embodiment of the space platform. As shown, the absorbing membrane 14 and the antenna-reflector assembly 18, 20 are aligned lengthwise of the balloon 12, with the antenna 18 being connected (as by a waveguide 19) to a suitable source of motive power 30 in order to energize the latter. The antenna 18 and the membrane 14 may be spaced axially of the vehicle as shown, or may be aligned vertically with energy thereupon reaching antenna 18 after first passing through and being partially absorbed by membrane 14. The output of the motor or engine 30 may take any suitable form, and may be a reaction stream such as from a jet engine or the like, or from the rotary propeller 22 shown. The particular form of the engine or other motive power source 30 is not a part of the present invention, and may be either a power source which is energized directly by the received electromagnetic energy or one which includes a means for converting such received energy into some other form suitable for energization of the motor output means. A complete description of engines suitable for this purpose is provided in the copending application of W. C. Brown, Serial Number 812,697, filed May 12, 1959, and assigned to the assignee of the present application. As disclosed in such copending application, an exemplary embodiment of an engine suitable for use in the vehicle of the present application includes a heat-exchanging container means adapted to be energized by microwave energy to heat a gaseous medium therein and cause expansion of same to produce a jet stream for providing a propulsive thrust. In one preferred form of the invention, the container means comprises an electromagnetic waveguide of lossy characteristics which produces heat upon energization by suitable electromagnetic energy to raise the temperature of a gaseous medium passing therethrough. A number of stacked and closely-spaced electrically lossy plates (of a material having suitable loss characteristics for a given application) is preferably mounted within the waveguide to serve as the main means for absorbing microwave energy and converting same into heat. The plurality of closely spaced plates form therebetween a series of narrow passages through which passes the gaseous medium which is to be heated thereby. The microwave energy employed is of sufficiently high frequency to produce a pronounced skin effect (i.e., the smallest penetration or skin depth commensurate with a desired heat loss in the material) in the waveguide and associated heat-exchanger, so that the energy expended in creating heat in the steady state condition is effectively and quickly transferred to the gaseous medium in which the particular conductor exhibiting the skin effect is immersed. This latter feature is particularly advantageous in transient-state conditions with respect to the ability of the engine of this invention to provide almost instantaneous response to a change in the level of the applied microwave energy, since little or no time lag is involved in converting electromagnetic energy to heat and transferring it to the cooling gas. As is evident, the heated gas may be formed into a jet stream in order to provide propulsion, or a turbine may be driven thereby to provide a rotary shaft output for driving a propeller or the like.

Figure 3:
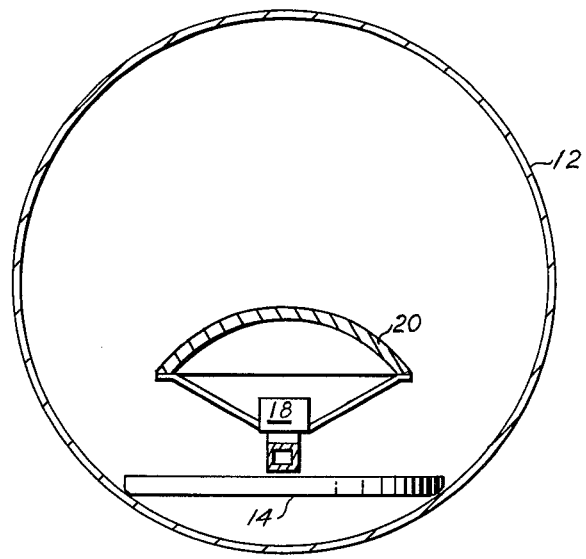
FIG. 3 is a sectional view of the space station of the invention, taken on line 3—3 in FIG. 2.

FIG. 3 shows the cross-sectional shape of the balloon 12, and illustrates more clearly the preferred relative positioning of the absorbing member 14 and the antenna 18 with its reflector 20 thereabove.

Figure 4:
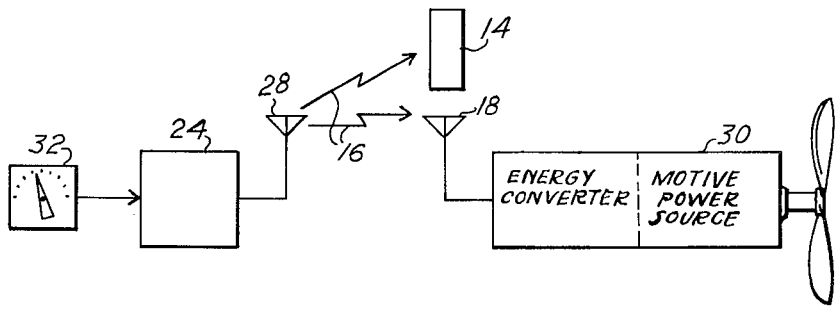
FIG. 4 is a block diagram of the system of the present invention.

The system for maintaining the space station at a desired location relative to the surface of the mother planet 26 is shown in schematic form in FIG. 4, wherein the transmitter 24 is adapted to have its output controlled by means of a control unit 32, which latter unit may preferably control the output amplitude of the transmitter 24 as applied to the transmitting antenna 28. It will, of course, be understood by those skilled in the art that the control unit 32 may take some other form, and may control some other parameter of the output signal applied to the antenna 28.

The energy received by the antenna 18 may be applied directly to the motive power source 30 as described in connection with the apparatus shown in FIG. 2.

In the operation of the apparatus and system of the present invention, the transmitter 24 is energized to apply electrical energy to the radiating antenna 28, under the control of the control unit 32, and a microwave beam 16 will be radiated from the antenna in accordance with the control applied to the transmitter by the control unit 32.

Upon reception of these electromagnetic waves by the absorbing member 14, the energy so absorbed is converted into heat and is transferred, as by convection, to the air or other gaseous matter within the interior of the bag 12. The application of this heat to the interior gas or air in the ballon causes an expansion of same as permitted by the flexible or elastic nature of the ballon, with a corresponding decrease in the density thereof. With a temperature differential being thus maintained between the temperature of the gaseous medium within the ballon and that without the balloon, and with a resulting corresponding density differential therebetween, the desired buoyancy is provided. By the continued application of energy to the absorbing means 14, additional heat is applied to the gaseous medium within the balloon 12, and the losses due to cooling of the bag and to diffusion of the interior gas to the exterior, and vice versa, are offset thereby.

The electromagnetic energy intercepted by the receiving antenna 18 is converted into propulsive force by the motive power source 30 (along with any other necessary energy-converting means), and a suitable propulsion substantially normal to the direction of the electromagnetic beam 16 may thus be provided to offset the action of wind forces applied to the bag 12. It will be understood by those skilled in the art that the application of such "horizontal" forces may be under the control of suitable control means at the transmitting station (as by providing the receiving antenna 18 with a suitable frequency filter and then adjusting the frequency of transmission from the transmitter 24 so as to energize the components connected to such receiving antenna only upon the transmission and reception of a frequency determined by the characteristics of the frequency filter employed), or may be automatically controlled entirely within the space station itself. An exemplary form of such automatic control at the space station is a beam-homing system wherein the propulsion means is energized only to the extent that wind forces tend to move the antenna 18 off or out of the microwave beam 16. With such a homing system, the propulsion means becomes energized when the antenna is moved away from the center of the beam of received energy as detected by means of a significant drop in the amplitude of the received energy. This, of course, assumes that the wind is not capable of moving the balloon off-beam so fast as to effectively remove the receiving antenna from the radiated beam, in which latter position no energy would be received to supply the restoring force. In this connection, the efficacy of the engine of the aforementioned copending application of W. C. Brown is evident. As stated above, the thermal time lag of this engine is minimal as a result of the fact that there is a significant skin effect in the microwave heat exchanger, and the transient-state heat changes are produced in intimate proximity to the fluid medium to be heated. As a result of the propinquity of the heat source (the shallow skin effect penetration of the heat-exchanging wall) and the sink (the fluid medium to be heated), such engines are able to respond almost instantaneously to a change in the power input, thus making the self-centering of vehicle 10 feasible. Obviously, where the control is to be effected from the transmitter station, some means would be necessary to track the balloon so as to provide information as to the necessity for supplying a restoring force by means of the propulsion motor on the vehicle.

Calculations show that for one exemplary form of the apparatus of the present invention, the balloon may be of a thin plastic material, of perhaps two mils in thickness, formed in the elongate shape of a cigar, with a major axis of 800 feet and diameter of 130 feet, providing a volume of 7.2 million cubic feet. With the internal air maintained at 94 degrees centigrade and a temperature differential of 150 degrees centigrade between the internal and external air, a total buoyancy of 16,800 pounds is achieved. For satisfactory operation at, for example, 65,000 feet, an engine large enough to counteract the peak wind velocities of 100 feet per second encountered at this altitude might weigh 1,000 pounds. The balloon would weigh 3,200 pounds, and the absorbing membrane might weigh 1,800 pounds. With an additional weight of some 5,000 pounds for the motor mountings, absorbing membrane mountings, servomechanisms, antenna and other structures, the total weight of the space station is 11,000 pounds. Subtracting this latter figure from the total buoyancy of 16,800 pounds, the "pay load" weight is 5,800 pounds. The total maximum power required is calculated to be 5 megawatts, approximately 20% of this power being needed for counteracting wind forces, and the remainder being employed to maintain the required buoyant lift. It will be understood that these values are merely exemplary of one particular form of the apparatus of the invention, for a given altitude and for maximum wind velocities, etc. The invention is not in any way limited to any of the values given above.

The balloon might be suitably launched from the surface of the earth by filling it with helium or the like, and lateral position could be maintained over the first mile or so of ascent by means of cables. The large density difference between helium and the low altitude air would probably create sufficient additional buoyant lift to support the cables. At one mile, for example, the radio frequency beam could be brought to focus on the balloon's receiving antenna to provide power for guidance thrust, and the cables could then be dropped. The balloon could subsequently be brought up to operating altitude, with the heating membrane being brought into operation to provide the necessary buoyancy as the helium diffuses through the balloon skin into the outer atmosphere.

Since the internal temperature of the ballon is contemplated to be below the boiling point of water, in the particular example given herein, the hot air will have no adverse effect on the plastic of the balloon or the other materials employed. Based upon the presently available data on meteor size and frequency, for a space station of the size and shape described above at an altitude of 65,000 feet, the probable total hole area in the balloon due to meteor collision over a period of a year would be but one square inch. The heat loss through meteor holes would thus be negligible, and any loss of air through such holes could be offset by a suitable air pump driven by the engine 30 and operative to pump air into the interior of the ballon, or, and where the air-loss is small, by merely creating more heat within the bag to increase the density differential.

The invention has been described above in some detail, and particularly with reference to its application to a cigar-shaped plastic balloon space station or other air vehicle to be maintained at an altitude of, say 65,000 feet above the surface of the earth. However, it will be apparent to those skilled in the art that the invention is equally applicable to enclosures of other shapes and sizes and for operation at other altitudes. In this connection, it is to be understood that the term "space" as employed herein is intended to indicate any desired altitude at which there is an atmospheric medium with respect to which the vehicle may be made buoyant. Also, any of the elements disclosed herein as being mounted within the balloon or other enclosure means may equally well be mounted exterior thereto; as is apparent, when the heat producing membrane is mounted exterior of the balloon, suitable means will be provided for conducting the generated heat into the interior of the balloon. Further, the space station may be maintained in a desired location in spaced-apart relationship with respect to a planet other than earth, or with respect to some other location for the energy-supplying transmitter, the term "mother planet" as employed herein being explicitly intended to include the several planets of the solar system including the earth, and other locations as well.

In addition, and from a more general standpoint, the broad concept of the present invention is not necessarily limited to the inclusion of means for providing the aforementioned lateral or horizontal forces for maintaining the vehicle "on station," since, for example, the operational altitude may be sufficiently low to permit tethering of the platform by guy wires or the like. Also, it should be noted that while the vehicle of the present invention is described as being energized solely by microwave electromagnetic energy, the vehicle may also include a conventional engine and fuel supply system for supplementing the action of the microwave engines until such fuel supply is exhausted. Further, the air vehicle disclosed herein need not necessarily be maintained at one selected position, but may equally well be permitted to move about relative to the mother planet so long as suitable means are provided for directing the desired energy to the vehicle. Hence, the invention is not to be considered as limited to the particular details given, nor to the specific application to which reference has been made during the description of the apparatus, except insofar as may be required by the scope of the appended claims.

What is claimed is:

1. A space vehicle comprising means adapted to be maintained in a spaced-apart relationship with a mother planet for enclosing a gaseous medium, and means communicating with such gaseous medium and responsive to incident microwave energy emanating from said mother planet to continuously maintain without the aid of storage means the density of such gaseous medium at a value less than that of the atmosphere surrounding said enclosure means.

2. A space vehicle in accordance with claim 1, wherein said density-maintaining means comprises means for heating such gaseous matter in response to such microwave energy.

3. A space station comprising an enclosure means adapted to be maintained in a spaced-apart relationship with a mother planet, means responsive to microwave energy for maintaining the density of gaseous matter within said enclosure means at a value less than that of the atmosphere surrounding said enclosure means to provide buoyancy with respect to the gravitational field of such mother planet, and means responsive to microwave energy for applying thrust forces to said enclosure means in a direction substantially opposite to that of incident wind, whereby said enclosure means may be maintained in such desired location in opposition to gravitational and wind forces applied thereto.

4. A space station comprising an enclosure means adapted to be maintained in a spaced-apart relationship with a mother planet, means for maintaining the density of gaseous matter within said enclosure means at a value less than that of the atmosphere surrounding said enclosure means to provide buoyancy with respect to the gravitational field of such mother planet, and means responsive to microwave energy for applying thrust forces to said enclosure means in a direction substantially opposite to that of incident wind, whereby said enclosure means may be maintained in such desired location in opposition to gravitational and wind forces applied thereto.

5. A space station comprising an enclosure means adapted to be maintained in a spaced-apart relationship with a mother planet, means responsive to microwave energy emanating from said mother planet for maintaining the density of gaseous matter within said enclosure means at a value less than that of the atmosphere surrounding said enclosure means to provide buoyancy with respect to the gravitational field of such mother planet for twenty-four hours per day without the aid of storage means, and means for applying thrust forces to said enclosure means in a direction substantially opposite to that of incident wind, whereby said enclosure means may be maintained in such desired location in opposition to gravitational and wind forces applied thereto.

6. A space station in accordance with claim 5, wherein said density-maintaining means includes means for introducing heat into the interior of said enclosure means to decrease the density of such gaseous matter therein by expansion.

7. A system for maintaining a space station comprising a balloon-like enclosure means adapted to be maintained in a spaced-apart relationship with a mother planet forming the main body of such space station, a control station on such mother planet for transmitting microwave energy to said enclosure means, means on said enclosure means responsive to incident microwave energy for maintaining the density of gaseous matter within said enclosure means at a value less than that of the atmosphere surrounding said enclosure means to provide buoyancy with respect to the gravitational field of such mother planet, and means responsive to incident microwave energy for providing thrust forces to said enclosure means in directions substantially opposite to incident wind forces.

8. A system for maintaining a space station in spaced-apart relationship with a mother planet at a selectable location with respect thereto, comprising a balloon-like enclosure means forming the main body of such space station, a control station on such mother planet for transmitting microwave energy to said enclosure means, means on said enclosure means responsive to incident microwave energy for maintaining the density of gaseous matter within said enclosure means at a value less than that of the atmosphere surrounding said enclosure means to provide buoyancy with respect to the gravitational field of such mother plant, means responsive to microwave energy for providing thrust forces to said enclosure means in directions substantially opposite to incident wind forces, and means for receiving energy transmitted from said control station, said thrust-providing means being connected to said receiving means and being energized by the energy received thereby, whereby said enclosure means may be maintained at such desired location in opposition to gravitational and wind forces applied thereto.

9. A space vehicle comprising means defining an enclosed volume, and means for heating such enclosed volume twenty-four hours per day to a temperature greater than that of a surrounding atmosphere without local consumption of a fuel or storage of energy, said heating means including a member of a lossy material responsive to continuous incident radiant energy from a mother planet for converting such energy into heat.

10. A space vehicle comprising means defining an enclosed volume, means for heating such enclosed volume to a temperature greater than that of a surrounding atmosphere without local consumption of a fuel, said heating means including a member of a lossy material responsive to incident radiant energy for converting such energy into heat, and means for applying thrust forces to said volume-defining means in a direction substantially opposite to that of incident wind without local consumption of a fuel, said thrust-applying means including energy-converting means responsive to incident radiant energy for converting such energy into mechanical thrust.

References Cited by the Examiner

UNITED STATES PATENTS

| 1,061,484 | 5/13 | Lowe | 244—30 |
| 2,471,744 | 5/49 | Hershberger | 324—92 |
| 2,564,675 | 8/51 | Crook | 219—10.55 |
| 2,769,601 | 11/56 | Hagopian et al. | 244—14 |
| 2,813,242 | 11/57 | Crump | 250—20 |
| 2,968,916 | 1/61 | Taylor et al. | 60—26 |

FERGUS S. MIDDLETON, *Primary Examiner.*

MILTON BUCHLER, *Examiner.*